(12) United States Patent
Alm et al.

(10) Patent No.: US 9,597,951 B2
(45) Date of Patent: Mar. 21, 2017

(54) COOLING SYSTEM FOR A MECHANICALLY AND HYDRAULICALLY POWERED HYBRID VEHICLE

(71) Applicant: VOLVO TRUCK CORPORATION, Göteborg (SE)

(72) Inventors: Filip Alm, Bohus (SE); Aleksandar Kovac, Fjärås (SE)

(73) Assignee: Volvo Truck Corporation, Göteborg (SE)

( * ) Notice: Subject to any disclaimer, the term of this patent is extended or adjusted under 35 U.S.C. 154(b) by 144 days.

(21) Appl. No.: 14/654,054

(22) PCT Filed: Dec. 16, 2013

(86) PCT No.: PCT/SE2013/000194
§ 371 (c)(1),
(2) Date: Jun. 19, 2015

(87) PCT Pub. No.: WO2014/098697
PCT Pub. Date: Jun. 26, 2014

(65) Prior Publication Data
US 2015/0315956 A1    Nov. 5, 2015

(30) Foreign Application Priority Data

Dec. 21, 2012 (WO) ............... PCT/SE2012/000216

(51) Int. Cl.
*B60K 6/12* (2006.01)
*F01P 7/12* (2006.01)
(Continued)

(52) U.S. Cl.
CPC *B60K 6/12* (2013.01); *F01P 3/20* (2013.01); *F01P 7/12* (2013.01); *F01P 7/16* (2013.01);
(Continued)

(58) Field of Classification Search
CPC ....... B60K 6/12; B60K 2006/123; F01P 3/20; F01P 7/12; F01P 7/16; F01P 7/165; F01P 2007/146; F01P 2060/045
(Continued)

(56) References Cited

U.S. PATENT DOCUMENTS 4,348,863 A * 9/1982 Taylor .................. B60K 6/12
60/327
4,535,729 A * 8/1985 Faylor .................. F01P 3/20
123/41.1
(Continued)

FOREIGN PATENT DOCUMENTS

DE          10153586 A1    5/2002
DE      102004021551 A1    2/2006
(Continued)

OTHER PUBLICATIONS

European Search Report (Aug. 31, 2016) for corresponding European App. EP 13 86 6042.
(Continued)

*Primary Examiner* — J. Allen Shriver, II
*Assistant Examiner* — Brian Cassidy
(74) *Attorney, Agent, or Firm* — WRB-IP LLP

(57) ABSTRACT

A cooling system for a heavy road vehicle provided with a hybrid propulsion system includes a mechanical propulsion system and a hydraulic propulsion system. The cooling system includes a pump and a first cooling circuit including a gearbox cooling circuit a hydraulic propulsion system cooling circuit and a first radiator for cooling of a coolant flowing in the first cooling circuit. The radiator is connected in series with and located upstream of the gearbox cooling circuit and the hydraulic propulsion system cooling circuit.

(Continued)

The cooling system is designed such that the hydraulic propulsion cooling circuit and the gearbox cooling circuit are connected in parallel.

13 Claims, 3 Drawing Sheets

(51) Int. Cl.
  *F01P 7/16* (2006.01)
  *F01P 3/20* (2006.01)
  *F01P 7/14* (2006.01)
(52) U.S. Cl.
  CPC ........ *F01P 7/165* (2013.01); *B60K 2006/123* (2013.01); *F01P 2007/146* (2013.01); *F01P 2060/045* (2013.01)
(58) Field of Classification Search
  USPC .......................................... 180/65.21; 165/41
  See application file for complete search history.

(56) References Cited

U.S. PATENT DOCUMENTS

| | | | | |
|---|---|---|---|---|
| 4,622,817 | A * | 11/1986 | Kobayashi | F02B 37/10 184/6.22 |
| 4,953,663 | A * | 9/1990 | Sugden | F16N 39/002 184/6.12 |
| 6,178,928 | B1 * | 1/2001 | Corriveau | F01P 7/048 123/41.12 |
| 7,334,543 | B2 * | 2/2008 | Pawellek | F01P 5/10 123/41.1 |
| 7,717,069 | B2 * | 5/2010 | Mokire | F01P 7/165 123/41.31 |
| 8,387,572 | B2 * | 3/2013 | Ulrey | F01P 7/167 123/41.44 |
| 8,695,543 | B2 * | 4/2014 | Adam | F01P 7/165 123/25 Q |
| 9,347,364 | B2 * | 5/2016 | Quix | F01P 3/12 |
| 9,394,858 | B2 * | 7/2016 | Richards | F02M 31/205 |
| 9,435,422 | B2 * | 9/2016 | Herrmann | F16H 57/0413 |
| 2004/0050544 | A1 | 3/2004 | Hohl et al. | |
| 2005/0139176 | A1 | 6/2005 | Bergstrom et al. | |
| 2007/0119429 | A1 * | 5/2007 | Jacquay | F16H 57/0415 123/557 |
| 2008/0210482 | A1 * | 9/2008 | Ishii | A01D 69/03 180/242 |
| 2011/0118075 | A1 * | 5/2011 | Kawasaki | B60K 6/48 475/331 |
| 2011/0139402 | A1 | 6/2011 | Kylefors et al. | |
| 2011/0212802 | A1 * | 9/2011 | Conlon | B60K 6/365 475/5 |
| 2012/0216983 | A1 | 8/2012 | Bennion et al. | |
| 2014/0150755 | A1 * | 6/2014 | Cunningham | F02B 29/0493 123/563 |
| 2015/0247564 | A1 * | 9/2015 | De Lathauwer | A01D 41/12 180/339 |
| 2015/0283892 | A1 * | 10/2015 | Larsson | B60K 6/12 180/243 |
| 2015/0315956 | A1 * | 11/2015 | Alm | F01P 3/20 123/41.08 |
| 2016/0069428 | A1 * | 3/2016 | Takayanagi | B60K 6/383 60/420 |
| 2016/0084146 | A1 * | 3/2016 | Almkvist | F01P 7/161 123/41.09 |
| 2016/0090896 | A1 * | 3/2016 | Takahashi | F01P 3/20 123/41.08 |
| 2016/0107501 | A1 * | 4/2016 | Johnston | B60H 1/00921 165/202 |
| 2016/0109194 | A1 * | 4/2016 | Kato | F01P 7/165 165/100 |
| 2016/0153174 | A1 * | 6/2016 | Naito | B60K 6/40 475/5 |
| 2016/0258340 | A1 * | 9/2016 | Klippert | F01P 5/10 |

FOREIGN PATENT DOCUMENTS

| | | |
|---|---|---|
| DE | 102008054699 A1 | 6/2010 |
| DE | 102011113242 A1 | 3/2012 |

OTHER PUBLICATIONS

International Search Report (Apr. 9, 2014) for corresponding International App. PCT/SE2013/000194.
International Preliminary Report on Patentability (Dec. 3, 2014) for corresponding International App. PCT/SE2013/000194.

* cited by examiner

COOLING SYSTEM FOR A MECHANICALLY AND HYDRAULICALLY POWERED HYBRID VEHICLE

BACKGROUND AND SUMMARY

The invention relates to a hybrid propulsion system for a vehicle provided with combined mechanical and hydraulic propulsion. The invention is in particular directed to a cooling system for such a vehicle.

For heavy road vehicles, it is known that there is sometimes a desire for providing driving force on several wheel pairs such that the vehicle for example is provided with a driving force on a rear pair of wheels as well as on front pair of wheels. In many cases, it is desirable to be able to control the traction of the vehicle such that one or several wheel pairs may be connected or disconnected from the power source depending on the traction force demand. The propulsion unit may be the same for all the driving wheels or be a combination of different power sources, e.g. a vehicle provided with a mechanical drive train connected to an internal combustion engine and a hydraulic power source connected to hydraulic motors. In general, the mechanical drive is used as the main propulsion system for road travel and the hydraulic drive used as an auxiliary drive for rough conditions at low speeds or for a vehicle in a work mode, e.g. when using creep drive for loading or unloading operations. Different examples of such vehicles are for example disclosed in WO 2011/100 206; U.S. Pat. Nos. 5,361,208; 3,780,820; EP 505 727; or US 2011/197 574.

Vehicles today are thus provided with traction forces on both rear wheels and front wheels using a combined mechanical and hydraulic drive and are designed and have control systems for enabling, disabling and controlling the different traction systems to be used efficiently. In order to provide an efficient traction using a combined mechanical and hydraulic system it is important to be able to manage the cooling of vehicle components including the hydraulic propulsion system. In order to provide an efficient cooling system it is generally considered that the cooling system used for the hydraulic propulsion system also may be used for other cooling demands in the vehicle. In U.S. Pat. No. 7,261,068 is described a cooling system for a work vehicle which may be used for cooling hydraulic oil as well as the engine, transmission oil and charge air.

However, even though cooling systems are known which are designed to manage essentially all cooling desired for a vehicle, as for example in U.S. Pat. No. 7,261,068, there is still a demand to develop a cooling system which is designed for the cooling of a heavy road vehicle provided with a hybrid propulsion system comprising mechanical and hydraulic propulsion systems in order to optimize the cooling and improve performance of the vehicle.

It is desirable to provide an efficient cooling for a hydraulic propulsion system which may be used for cooling hydraulic liquid for the propulsion system as well as other parts of the vehicle. The cooling system is designed for a hydraulic propulsion system used as an additional propulsion system together with a mechanical propulsion system to power wheels of the vehicle.

In general, the hydraulic propulsion system is intended to only be active during slow speeds, for example when there is a desire for additional power or used as the single traction source when performing work or driving slowly with frequent stop and go. It is therefore a desire to be able to design the cooling system such that it may cool the hydraulic propulsion system and other parts of the vehicle in dependence of the total cooling demand.

Since the hydraulic drive is not intended to be used at certain conditions, e.g. when using the vehicle at rather high speeds, the cooling demand for the hydraulic propulsion system differs from the cooling demand for the mechanical propulsion system. Hence, there are peculiar design issues when designing a cooling system for a hybrid heavy road vehicle which causes the cooling system to include certain features in order to function in an efficient way.

The present invention is thus directed to a cooling system for a heavy road vehicle comprising a hybrid propulsion system including a first, mechanical propulsion system and a second, hydraulic propulsion system. The first, mechanical propulsion system comprises a mechanical drive train including an internal combustion engine which provides a traction force to a first traction wheel via a gearbox. The second, hydraulic propulsion system comprises a hydraulic pump unit for powering a hydraulic motor in order to provide a traction force to a second traction wheel.

The cooling system further comprises a pump and a first cooling circuit including a gearbox cooling circuit, a hydraulic propulsion cooling circuit and a first radiator for cooling of a coolant flowing in the first cooling circuit. The radiator is connected in series with and located upstream of the gearbox cooling circuit and the hydraulic propulsion cooling circuit.

The cooling system of the hybrid heavy vehicle is designed such that the hydraulic propulsion cooling circuit and the gearbox cooling circuit are connected in parallel.

The cooling system further comprises a temperature dependent thermostat which is positioned downstream the hydraulic cooling circuit, the temperature dependent thermostat is configured to increase the coolant flow through the gearbox cooling circuit relative the coolant flow through the hydraulic propulsion coolant circuit if a measured temperature of the coolant flow downstream the gearbox cooling circuit exceeds a predetermined threshold temperature.

The measured temperature may be measured by means of a temperature measuring device, such as e.g. a thermometer or a temperature sensor. The temperature measuring device may be configured to measure the temperature of the coolant flow downstream of the gearbox cooling circuit. The predetermined temperature threshold may vary depending on the circumstances and specific use of the vehicle the system is provided to. The skilled person is familiar with gearbox temperatures that may adversely affect the gearbox both in a short time perspective as well as in a long time perspective.

According to a further advantage of the present invention, a smaller cooler, in terms of cooling power, can be used for the system of the present invention, since the cooler does not have to be able to supply cooling for a required maximum cooling of the gearbox and the hydraulic system at the same time.

The cooling system may further comprise a second cooling circuit which comprises an engine cooling circuit. This second cooling circuit is arranged in parallel with the first cooling circuit. By arranging the cooling circuits in parallel it is possible to provide coolant flows having different properties, e.g. temperature and mass flow, in order to achieve a desired cooling effect for different purposes. In general, there is a desire to provide a coolant having a lower temperature for the hydraulic liquid in the hydraulic propulsion system and the gear box lubrication oil than for the engine cooling circuit. By providing two parallel coolant flows it is thus possible to get the desired lower coolant temperature for the first circuit without the need to use coolant at a too low temperature for the second circuit and thereby achieve a desired cooling of the engine without wasting energy in reducing the coolant temperature to an unnecessary cold temperature. In addition, providing two separate flows at different temperatures may also make it easier to cool further parts of the vehicle by using a coolant being in a suitable temperature range or allow a more efficient heating of certain parts as will be discussed further below.

The cooling system may further be designed such that a second radiator is located in the cooling system and arranged to receive a return flow from the second cooling circuit. According to one embodiment, this second radiator may be bypassed by the return flow from the first cooling circuit. The cooling system may thus be arranged such that the coolant flowing in the first coolant flow bypasses the second radiator but is returned to the cooling system upstream a pump while the flow from the second cooling circuit is directed through the second radiator before it is mixed with the coolant flow from the first coolant circuit upstream of the aforementioned pump such that both the flow from the first and second cooling circuits are mixed upstream a common pump for both return flows. Hence, the return flow from the second cooling circuit and the return flow from the first cooling unit may thus be used as inflows to a pump common for both circuits. The flow from the pump is thereafter divided to a flow entering the second circuit and a flow entering the first circuit which is cooled by the first radiator before it will flow on to either of the parallel connected hydraulic propulsion coolant circuit and gear box cooling circuit.

In a still possible configuration of the coolant system, the return flow from the first cooling circuit may also be directed to pass through the second radiator, either the complete flow or having a divided flow in which a part of the return flow is directed to pass through the second radiator and a part of the flow is bypassing the second radiator. The partial flows may be controlled by a valve.

It is also possible to design the return flow of the second cooling circuit such that it comprises a bypass conduit which bypasses the second radiator. The proportion of coolant flow in the second cooling circuit which passes through the second radiator respectively the bypass conduit may be controlled by a thermostat. The thermostat may be arranged in the second cooling circuit at a position downstream the engine cooling circuit, such that a return flow from the second cooling circuit is configured to be controlled by the thermostat to control the proportion of the coolant flow which passes through the second radiator or a bypass conduit bypassing the second radiator. The bypass flow may be used in particular at start up conditions when the coolant is rather cold and there may be a desire to use the coolant in the second cooling circuit for heating purposes as will be discussed further below. Since the second cooling circuit includes the engine cooling circuit is the coolant flow in this circuit normally heated quicker than the coolant flow in the first cooling circuit why the coolant in the second cooling flow in general is more suitable to be used for heating.

The first radiator and the second radiator are preferably air to coolant heat exchangers in which a fan is used to produce an air flow through the heat exchangers in order to cool the coolant. The radiators may be arranged in close proximity to each other and be cooled at least partially by the same air flow. Hence, the first and the second radiator may be arranged to be cooled by means of a common air flow fan. By such an arrangement only one fan may be needed. Since there in general is a desire for a cooler coolant in the first cooling circuit it is usually an advantage to locate the first radiator upstream of the second radiator in said air flow such that the coldest air is used in the first radiator.

Concerning the control of the coolant flows which flows through the hydraulic propulsion cooling circuit and the gearbox cooling circuit in the first cooling circuit may the proportion of the parallel flows be divided in dependence on the temperature of the gearbox. The cooling of the gear box is prioritized compared to the cooling of the hydraulic propulsion system since the hydraulic propulsion system may be turned off if overheated while the gearbox is essential during almost all driving conditions. Hence, the flow in the first circuit is controlled such that the flow of coolant through the gearbox cooling circuit is increased relative the flow through the hydraulic propulsion cooling circuit if the measured temperature of the gearbox is increased, i.e. exceeds the predetermined temperature threshold as described above. The temperature dependent control of the relative flow through the hydraulic propulsion cooling circuit and the gearbox cooling circuit may be controlled in dependence of the temperature by means of the thermostat. Again, the thermostat may be set to be sensitive to the temperature of the return flow of the coolant from the gear box cooling circuit. Above a certain temperature limit the thermostat may automatically change the relative flow through the hydraulic propulsion cooling circuit and the gearbox cooling circuit such that the flow through the hydraulic propulsion cooling system is reduced and thus the flow through the gearbox cooling unit is increased. The temperature dependent thermostat may be a temperature sensitive mechanical wax valve. Other types of temperature dependent thermostats are of course conceivable, such as e.g. a three-way valve, a check valve, etc.

Under certain conditions it may be desired to reduce the cooling of the hydraulic propulsion system, e.g. in cold conditions while the coolant and the hydraulic liquid is substantially cold by the environment. In this case the flow of hydraulic liquid through the heat exchanger in the hydraulic propulsion cooling circuit may be reduced. This may be achieved by incorporating a bypass conduit for the hydraulic liquid circuit in the hydraulic propulsion cooling circuit which allows a flow of hydraulic liquid to bypass the heat exchanger in which heat is exchanged between the coolant and the hydraulic liquid. The flow through the bypass conduit may be configured to be controlled in dependence of a measured temperature in the hydraulic propulsion cooling circuit and/or the coolant temperature, e.g. by means of a temperature regulated valve in the bypass conduit which is closed when the temperature is indicated to be sufficiently high but closed in response to a temperature indication below a certain value. The valve could be electronically controlled or be designed to mechanically open up automatically when subjected to a coolant temperature below a certain limit.

The cooling system may further include the feature of including one or several heating circuits in the second cooling circuit. By a heating circuit is meant a circuit configured for heating purposes, e.g. a urea heating circuit and/or a cab heating circuit. These heating circuits are preferably connected in parallel with the engine cooling circuit, alternatively arranged in series with the engine cooling circuit and provided with bypass conduits such that the heating circuit may be heated or bypassed by changing a bypass valve. If the heating circuits are connected in parallel with the engine cooling circuit they could be arranged to have its inlet connected to the cooling system downstream the pump, before the engine cooling circuit and its outflow connected to the bypass conduit return flow in the second cooling circuit, i.e. the return flow conduit bypassing the second radiator. The heating circuits are advantageously located in the coolant flow receiving heat from the engine cooling circuit in order to provide a rapid heating.

The second cooling circuit may include further cooling circuits as well, e.g. a retarder cooling circuit may be connected in series with the engine cooling circuit, preferably downstream the engine cooling circuit.

The first cooling circuit may be designed such that the return flow is connected to the cooling system downstream of the second radiator.

The hydraulic propulsion cooling circuit is preferably a liquid to liquid heat exchanging arrangement and comprises a hydraulic liquid circuit which is in thermic contact with the first cooling circuit in a heat exchanger. In order to be able to reduce the cooling of the hydraulic propulsion system, the hydraulic liquid circuit may be provided with a bypass conduit, bypassing the heat exchanger in the hydraulic propulsion cooling circuit, comprising a valve. The valve may be configured to open in dependence of the temperature of the coolant and/or the temperature of the hydraulic liquid in the hydraulic propulsion cooling circuit, i.e. the valve opens up when the temperature is below a certain limit, either completely or to different degrees proportional to the temperature. The purpose is thus to avoid cooling of the hydraulic liquid when its temperature is below a desired working temperature.

According to an example embodiment, a control unit may be configured to turn off the hydraulic propulsion system is a measured temperature of the hydraulic propulsion coolant circuit and the gearbox cooling circuit is above a predetermined temperature threshold limit.

Hereby, if the cooling demand for the hydraulic system and the gearbox is larger than the cooling capability of the cooling system, the control unit can turn off the hydraulic propulsion system to only provide coolant to the gearbox. Accordingly, it is the total temperature for the hydraulic propulsion system and the gearbox system that is compared to the threshold limit.

The threshold limit can be set by the skilled person in such a way that temperatures below such limit are not adversely affecting either the hydraulic system as well as the gearbox. It should also be readily understood that the specific control unit can be any control unit already present on the vehicle. The control unit can hence also receive, from temperature sensors, the measured temperature of the hydraulic propulsion cooling circuit and the gearbox cooling circuit.

The invention also relates to a heavy road vehicle provided with a hybrid propulsion system comprising mechanical and hydraulic propulsion units provided with a cooling system as defined above.

Concerning the cooling system described above, it is obvious that it may comprise further valves, sensors, pumps cooling circuits or other features commonly used in cooling systems. The system disclosed above describes certain features which advantageously may be used in a wide variety of systems.

DETAILED DESCRIPTION

Figure 1:
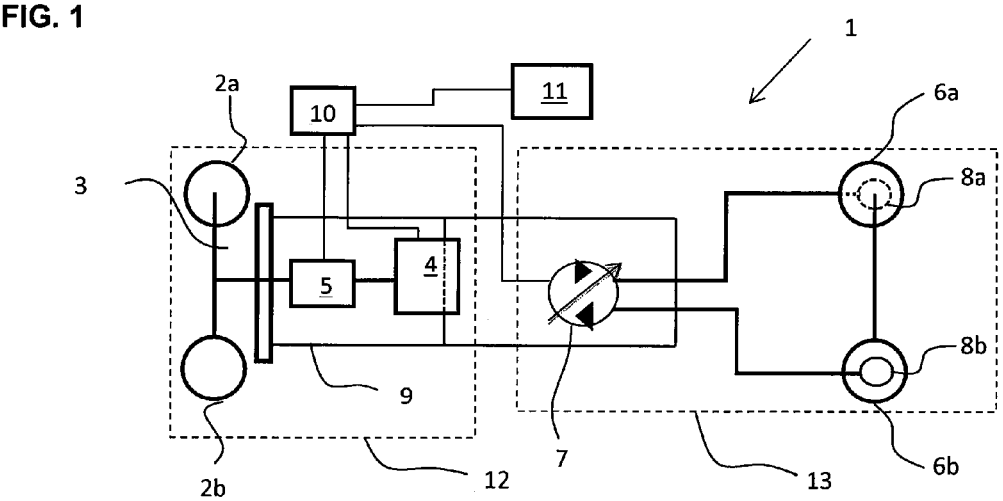
FIG. 1 describes a schematic view of a heavy load carrying vehicle provided with an auxiliary hydraulic traction on the front wheels and a cooling system FIG. 2a-2f describes a cooling system according to different embodiments of the invention

In FIG. 1 is shown a schematic view of a propulsion system 1 for a heavy road vehicle. The propulsion system 1 comprises a first mechanical propulsion system 12 and a second hydraulic propulsion system 13. The first mechanical propulsion system 12 comprises a pair of traction wheels 2a, 2b which are located on a rear, driven axle 3 which is powered by an internal combustion engine (ICE) 4. The rear, driven axle 3 is connected to the ICE 4 via a gearbox 5. The gear box 5 may be a stepped gear box and the mechanical drive train may comprise a Double Clutch Transmission (DCT) in order to reduce the time for a change of gear. The second, hydraulic propulsion system 13 further comprises a second pair of traction wheels 6a, 6b, the front wheels, which are driven by a pair of hydraulic motors 8a, 8b which are connected to and powered by a hydraulic pump unit 7. The hydraulic propulsion system 13 further comprises a cooling system 9. The cooling system will be shown in detail in FIG. 2. In order to be able to control the hydraulic flow as desired there is of course different valves, e.g. flow direction valves and cut off valves, present in the hydraulic propulsion system 13.

The traction system 1 further comprises a control unit 10 which is connected to the ICE 4, the gear box 5 and the hydraulic pump unit 7. By control unit in this context is meant one or several physical entities which form a control unit and sends control signals to desired systems of the vehicle. Even though it is not necessary for the control unit 10 to be connected to the ICE 4 and gear box 5, it is considered to be beneficial for providing a desired control of the hydraulic propulsion system 13. The control unit could of course also be connected to other parts of the propulsion systems 12, 13, e.g. it may be connected to the hydraulic motors 8a, 8b in order to send output signals to control valves in the motors 8a, 8b and the cooling system 9 in order to control different parts of the cooling system 9, e.g. pumps, valves, fans or other controllable parts of the cooling system, in order to manage the temperature of parts included in the cooling system 9.

The control unit may be connected to a variety of sensors, e.g. temperature sensors for sensing the temperature of the coolant or hydraulic liquid, various speed sensors, e.g. engine speed or hydraulic pump speed, or load sensors as indication of estimated heat production in order to control the cooling system. The control unit 10 may further be connected to a traction regulator 11 which is used by the driver for selecting between different drive modes, e.g. hybrid drive (both mechanical and hydraulic propulsion systems used), normal drive (only mechanical propulsion used) and creep drive (only hydraulic propulsion used). It may also be possible to have an automatic or semi-automatic mode selection which selects suitable propulsion units to be used, e.g. only mechanical propulsion at velocities above a certain speed limit and activate the hydraulic propulsion automatically if it is detected a wheel slip or wheel spin. The cooling system 9 may be designed such that it changes its flow paths and flow volume in dependence on the selected driving mode to meet the expected cooling demands.

It is of course possible to include further wheels to be driven by the mechanical or hydraulic propulsion systems as well as non-driven wheels. Likewise, it is of course possible to change the propulsion such that the rear wheels 2a, 2b are driven by the hydraulic propulsion system 13 and the front wheels 6a, 6b are driven by the mechanical propulsion system 12.

Figure 2A:
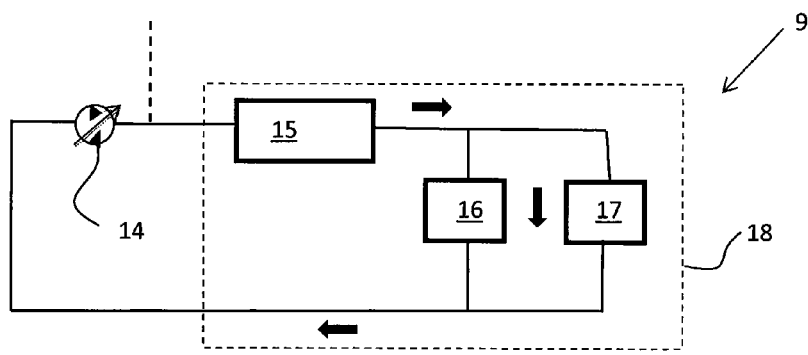

In FIG. 2a is described a cooling system 9 according to a first embodiment of the invention. In this embodiment is described a first cooling circuit 18 comprising a radiator 15, for cooling of a coolant to be used in the first cooling circuit 18, a gear box cooling circuit 16 and a hydraulic propulsion cooling circuit 17. As disclosed in relation to this figure, the gear box cooling circuit 16 and the hydraulic propulsion cooling circuit 17 are arranged in parallel downstream of the first radiator. The return flow from the first cooling circuit 18 is delivered to the pump 14 in order to be re-circulated to first cooling circuit 18 again.

By arranging the gear box cooling circuit 16 and the hydraulic propulsion cooling circuit 17 in parallel it will be possible to divide and direct the coolant flow through these circuits as desired depending on the cooling demand. Hence, the flow of coolant through the hydraulic propulsion cooling circuit 17 may be reduced or cut off when the hydraulic propulsion system 13 (see FIG. 1) is not used.

The first radiator 15 is for example a coolant to air heat exchanger and the gear box cooling circuit 16 and the hydraulic propulsion cooling circuit may be coolant to oil heat exchanger wherein the coolant is heat exchanged with the hydraulic oil used for propulsion of the vehicle in the hydraulic propulsion system 13 respectively lubrication oil used in the gear box 5.

Figure 2B:
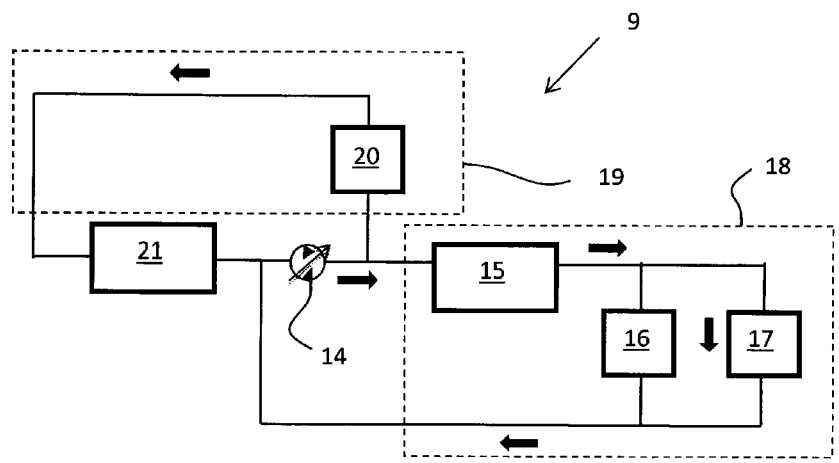

In FIG. 2b is disclosed how a second cooling circuit 19 may be incorporated in the cooling system 9. The second cooling circuit 19 includes an engine cooling circuit 20 and has a return flow to the coolant pump 14 which passes through a second radiator 21 before it reaches the coolant pump 14. In this embodiment it is further shown that the return flow from the first cooling circuit 18 is returned upstream the coolant pump 14 but downstream the second radiator. However, the return flow from the first cooling circuit 18 could of course also be arranged to be delivered upstream of the second radiator 21.

Hence, the first and second cooling circuits 18, 19 may be arranged such that they may provide coolant having different temperatures. In general, there is a desire to have a lower temperature in the coolant used for the hydraulic propulsion cooling circuit 17 and gear box cooling circuit 16 than what is needed for the engine cooling circuit 21. Hence, this arrangement allows the coolant to be used in the first and second cooling circuits 18, 19 to have different temperatures since there is an additional cooling of the coolant used in the first cooling circuit 18 by the first radiator 21 before the coolant enters the hydraulic propulsion cooling circuit 17 and/or the gear box cooling circuit 16. By arranging both the first and second cooling circuits 18, 19 in the same cooling system 9 it is further possible to use the same coolant pump 14 for both circuits 18, 19. Hence, FIG. 2b discloses an advantageous embodiment of incorporating the first cooling circuit 18 shown in FIG. 2a in a cooling system also including a second cooling circuit 19 for cooling of the engine 4 (see FIG. 1).

The first and second radiators 15, 21 may for example be located adjacent to each other such that they may benefit from the same air stream and using the same fan (not shown). The radiators 15, 21 are preferably located such that the first radiator is located upstream of the second radiator such that the air used for the first radiator 15 is cooler than the air used for the second radiator 21 in order to be able to provide a more efficient cooling, and thus lower coolant temperature, for the coolant in the first cooling circuit 18.

The first cooling circuit 18 may be branched off before the engine 4. More specifically, the first 18 and the second 19 cooling circuits are separated from each other at a position upstream the engine 4 and hence the engine cooling circuit 20. In general, there is a desire for a lower coolant temperature, e.g. around 80 degrees Celsius, for the cooling of hydraulic or gear box oil than what is needed for cooling of the engine.

Figure 2C:
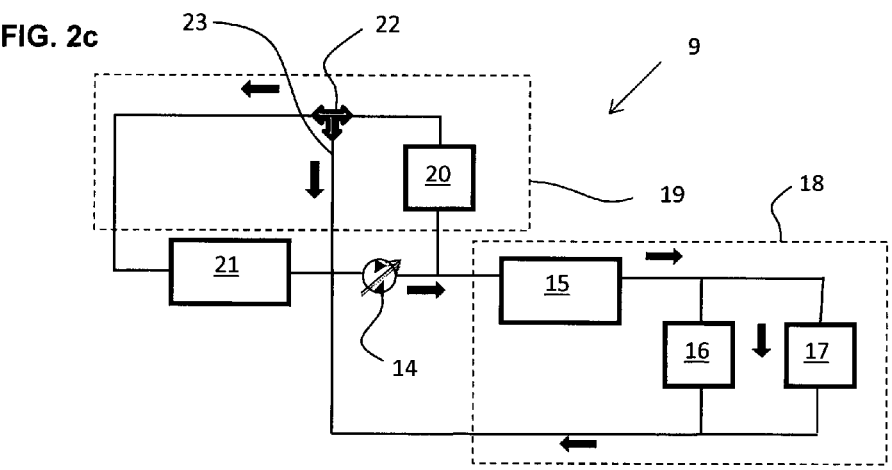

In FIG. 2c is shown a modification of the embodiment of FIG. 2b in which a bypass conduit 23 has been included in the second cooling circuit 19. The bypass conduit 23 thus bypasses the second radiator 21 such that the return flow may be returned to the coolant pump 14 without being cooled. A thermostat 22, in the following denoted as a first thermostat 22, may be used to control and direct the coolant flow through the second cooling circuit 19 such that a desired proportion of the return flow is directed through the second radiator 21 and the bypass conduit 23, respectively. Hence, it is possible to bypass the second radiator 21 for example at startup of the vehicle in order to enhance the heating of the engine to a desired operating temperature.

Figure 2D:
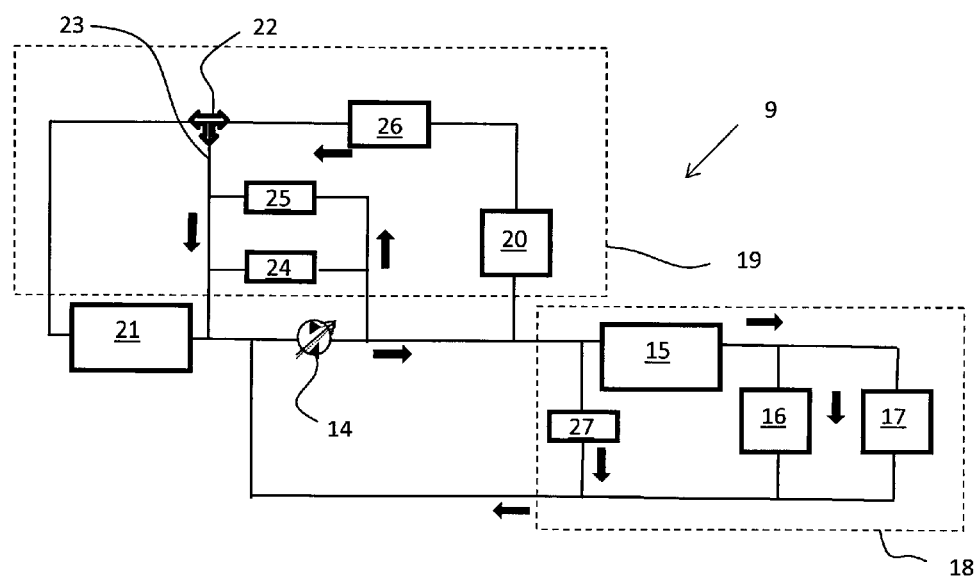

In FIG. 2d is disclosed that further objects to be cooled (or heated) may be incorporated in the cooling system. In this figure has for example an urea heating circuit 24 and a cab heating circuit 25 been added to the second cooling circuit and arranged in parallel with the engine cooling circuit 20. The urea heating circuit 24 and the cab heating circuit 25 has their return flows connected to the bypass conduit 23 since when these circuits are used there is a desire to transfer heat to the urea respectively the cab and there is thus a desire to provide a rather hot coolant in these circuits while these circuits will provide a cooling effect to the coolant such that the need to pass the coolant through the second radiator is reduced. In addition, also a retarder cooling circuit 26 has been introduced in the second cooling circuit 19 in series and downstream of the engine cooling circuit 20. In the first cooling circuit 18, an air compressor cooling circuit 27 has been added.

Hence, a multitude of cooling or heating circuits may be added at appropriate locations in the cooling system 9. As disclosed herein, heating circuits may advantageously be incorporated in the second cooling circuit 19, comprising the engine cooling circuit 20, since this cooling circuit will be heated rather quickly and the heating of different elements may thus be performed at start up of the vehicle. As long as there is a heating desire for different features in the second cooling circuit 19, the first thermostat 22 is preferably controlled to provide all or a major part of the return flow via the bypass conduit 23 in order to avoid unnecessary cooling of the coolant.

In case there is a cooling desire for different features they may be included in either of the first or second cooling circuit 18, 19 depending on the cooling demand and desired temperature. For a device which needs to be cooled to a rather low temperature, the cooling circuits are preferably included in the first cooling circuit 18 which is able to provide a coolant flow having a lower temperature than the coolant in the second cooling circuit 19. On the other hand, if there is a demand for rapid heating of a device, such a heating circuit is preferably included in the second cooling circuit which is heated rather quickly. In general, the coolant flow in the second circuit is larger than the flow in the first circuit why devices having a large cooling demand may be included in the second circuit.

Figure 2E:
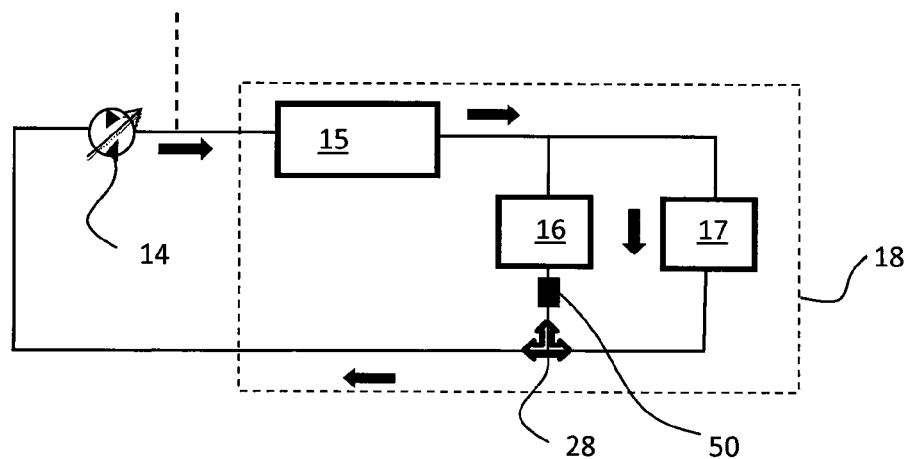

In FIG. 2e is disclosed a modification of the first cooling circuit 18 disclosed in FIG. 2a. In this modified cooling circuit has a temperature dependent thermostat 28, in the following referred to as a second thermostat 28, been added in order to control the relative flows through the gear box cooling circuit 16 and the hydraulic propulsion cooling circuit 17. The second thermostat 28 is preferably arranged such that it responds to the temperature in the gear box 5, e.g. in response to the temperature of the coolant flowing from the gearbox cooling circuit 16, such that the flow through the hydraulic cooling circuit is decreased, or even completely turned off, when the temperature in the gearbox 5 is above a certain limit. The temperature is preferably measured downstream the gearbox cooling circuit 16 by means of a temperature measuring device 50 of suitable type. In case the total cooling demand not may be satisfied in the first cooling circuit 18, the hydraulic propulsion system 13 may be turned off until it is decided that the cooling effect in the system is sufficient to cool both the gear box 5 and the hydraulic propulsion system 13, e.g. when the coolant in the first cooling circuit 18 leaving the gear box cooling circuit 16 is below a certain temperature limit.

The second thermostat may, instead of or additional to the temperature measuring device 50, either be electronically controlled having temperature sensors sensing the temperature of the coolant leaving the gearbox cooling circuit 16 or the temperature of the gear box itself or the gear box oil. Alternatively, the second thermostat 28 may be a temperature sensitive mechanical valve which in dependence of the temperature of the coolant flow from the gear box cooling circuit 16 adjusts the proportions of the coolant flow, in dependence of the measured temperature, from the gear box cooling circuit 16 and the hydraulic propulsion cooling circuit 17 such that the flow through the gearbox cooling circuit is increased with increased temperature. Still further, the second thermostat 28 may be connected to the temperature measuring device 50 by means of a control unit, such that the control unit controls the state of the second thermostat in dependence of the measured temperature by the temperature measuring unit. Accordingly, the increase in cooling supplied to the gearbox may be proportional to the increase in temperature of the gearbox. The thermostat may for example be a temperature sensitive mechanical wax valve which in dependence of the temperature control the coolant flow through the hydraulic propulsion cooling circuit 17 to decrease in response to an increased temperature of the coolant flow from the gearbox cooling circuit 16 thus increasing the coolant flow through the gearbox cooling circuit.

Furthermore, the second thermostat 28 may be positioned as illustrated in FIG. 2e, i.e. at the branching point where the conduits from the gearbox cooling circuit and the hydraulic cooling circuit merge.

This arrangement could easily be fitted into any of the embodiments shown in FIGS. 2a to 2d in order to control the proportional flow in the first cooling circuit 18.

Figure 2F:
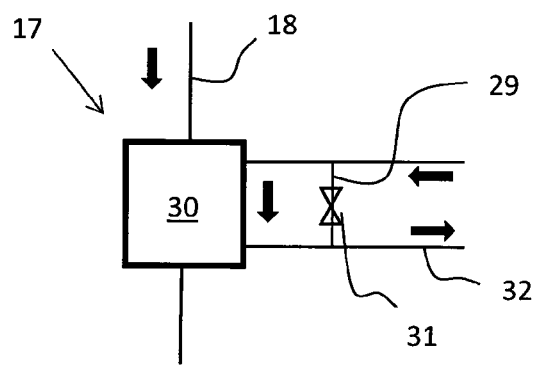

In FIG. 2f is disclosed a detailed description of a hydraulic propulsion cooling circuit 17. The hydraulic liquid circuit 32 is provided with a bypass conduit 29 such that the hydraulic liquid entering the hydraulic propulsion cooling circuit 17 may flow through the bypass conduit 29 and not enter the heat exchanger 30 wherein the hydraulic liquid is heat exchanged with coolant in the first coolant circuit 18. The bypass conduit 29 is provided with a valve 31 which is temperature dependent. The valve 31 is normally closed during normal operation such that the hydraulic liquid from the hydraulic propulsion system 13 enters the heat exchanger 30 and is cooled by the coolant in the first cooling circuit. However, in certain instances, may it be desired to not cool the hydraulic liquid in the hydraulic propulsion system 13, e.g. when the hydraulic liquid not has reached a suitable operating temperature due to extreme cold temperatures and/or when the system is sparsely used such that the hydraulic liquid not is heated enough from the operation conditions.

One design of the valve 31 is a spring loaded check valve with 1-3 bar opening pressure. At low oil temperature the viscosity is high generating a high pressure drop over the heat exchanger 17. This will open the pressure dependent valve 31, thereby reducing the oil flow over the heat exchanger.

It is obvious that further cooling systems in addition to the above described embodiments may be designed based on the basic principle idea of the present invention and further devices to be cooled may be included in the cooling circuits as well as further valves, thermostats or pumps in order to direct, control and provide a sufficient flow in the cooling system.

The invention claimed is:

1. A cooling system for a heavy road vehicle comprising to hybrid propulsion system, the hybrid propulsion system comprising
   a first, mechanical propulsion system comprising a mechanical drive train including an internal combustion engine which provides a traction force to a first traction wheel via a gearbox,
   a second, hydraulic propulsion system comprising a hydraulic pump unit for powering a hydraulic motor (8a) in order to provide a traction force to a second traction wheel, wherein the cooling system further comprises a pump and a first cooling circuit including a gearbox cooling circuit, a hydraulic propulsion cooling circuit and a first radiator for cooling of a coolant flowing in the first cooling circuit, the radiator being connected in series with and located upstream of the gearbox cooling circuit and the hydraulic propulsion cooling circuit,
wherein
   the hydraulic propulsion cooling circuit and the gearbox cooling circuit are connected in parallel, wherein
   a temperature dependent thermostat is positioned downstream the hydraulic cooling circuit, the temperature dependent thermostat being configured to increase the coolant flow through the gearbox cooling circuit relative the coolant flow through the hydraulic propulsion coolant circuit if a measured temperature of the coolant flow downstream the gearbox cooling circuit exceeds a predetermined threshold temperature,
   and wherein the coaling system further comprises a control unit configured to turn off the hydraulic propulsion system if a measured temperature of the hydraulic propulsion cooling circuit and the gearbox cooling circuit is above a predetermined temperature threshold limit.

2. A cooling system according to claim 1, wherein the cooling system further comprises a second cooling circuit comprising an engine cooling circuit, the second cooling circuit being arranged in parallel with the first cooling circuit.

3. A cooling system according to claim 2, wherein a second radiator is located in the cooling system and arranged to receive a return flow from the second cooling circuit.

4. A cooling system according to claim 3, wherein the first radiator and the second radiator are arranged to be cooled by means of a common air flow fan, wherein the first radiator is located upstream of the second radiator in the air flow.

5. A cooling system according to claim 1, wherein the temperature dependent thermostat is a temperature sensitive mechanical lolax valve.

6. A cooling system according to claim 1, wherein the flow through the hydraulic propulsion cooling circuit is configured to be controlled in dependence of a measured temperature in the hydraulic propulsion cooling circuit by means of a temperature regulated valve.

7. A cooling system according to claim 3, wherein a thermostat is arranged in the second a position downstream circuit, such that cooling circuit at the engine cooling a return flow from the second cooling circuit is configured to be controlled by the thermostat to control the proportion of the coolant flow which pass through the second radiator or a bypass conduit bypassing the second radiator.

8. A cooling system according to claim 2, wherein a return flow from the second cooling circuit and a return flow from the first cooling circuit are used as inflows to a pump common for both circuits.

9. A cooling system according to claim 2, wherein the second cooling circuit further includes a heating circuit, the heating circuit is configured for heating purposes such as an urea heating circuit (24) and/or a cab heating circuit, connected in parallel with the engine cooling circuit, the heating circuit having an inlet connected to the cooling system downstream the pump and an outflow connected to the bypass conduit return flow from the second cooling circuit.

10. A cooling system according to claim 2, wherein the second cooling circuit includes a retarder cooling circuit (26) connected series with the engine cooling circuit, preferably downstream downstream the engine cooling circuit.

11. A cooling system according to claim 3, wherein the return flow from the first cooling circuit is connected to the cooling system downstream of the second radiator.

12. A cooling system according to claim 1, wherein the hydraulic cooling circuit comprises hydraulic liquid circuit which is in thermic contact with the first cooling circuit exchanger, the hydraulic comprises a bypass conduit the heat exchanger in in a heat liquid circuit bypassing the hydraulic propulsion cooling circuit, the bypass conduit is provided with a valve which is configured to open in dependence of the temperature of the coolant and/or the temperature of the hydraulic liquid in the hydraulic propulsion cooling circuit in order to avoid cooling of the hydraulic liquid when the temperature of the hydraulic liquid is below a desired working temperature.

13. A heavy road vehicle provided with a hybrid propulsion system comprising mechanical and hydraulic propulsion units provided with a cooling system according to claim 1.

* * * * *